United States Patent [19]

Butcher

[11] 3,969,940

[45] July 20, 1976

[54] FLUID FLOW METER

[75] Inventor: Alan George Butcher, Wokingham, England

[73] Assignee: Dresser Europe, S.A., Brussels, Belgium

[22] Filed: Dec. 11, 1974

[21] Appl. No.: 531,746

[30] Foreign Application Priority Data

Dec. 11, 1973  United Kingdom.............. 57435/73

[52] U.S. Cl................................... 73/253; 418/191
[51] Int. Cl.².......................................... G01F 3/08
[58] Field of Search....................... 73/253; 418/191

[56] References Cited
UNITED STATES PATENTS 3,518,882  7/1970  Granberg............................ 73/253

FOREIGN PATENTS OR APPLICATIONS 386,171  12/1923  Germany............................... 73/253
138,627  5/1921  United Kingdom................... 73/261

OTHER PUBLICATIONS

"Oval Large Capacity Meters," Catalogue No. M–1003, p. 7, Oval Engineering Co., Ltd. – Tokyo, Japan, 3–66.

Primary Examiner—James J. Gill
Attorney, Agent, or Firm—Wenderoth, Lind & Ponack

[57] ABSTRACT

A fluid flow meter of the positive displacement rotary kind where a housing defines an annular passage coupling input and output ports, a rotor has depending blades which are driven around the passage by the flow of fluid and an idler has pockets which accommodate the rotor blades in sealed relationship as the blades pass from outlet to inlet, the invention being characterized in the provision of two rotors each having blades and pockets and two annular passages accommodating respectively the blades of the different rotors, and each rotor constitutes the idler for the other rotor.

4 Claims, 5 Drawing Figures

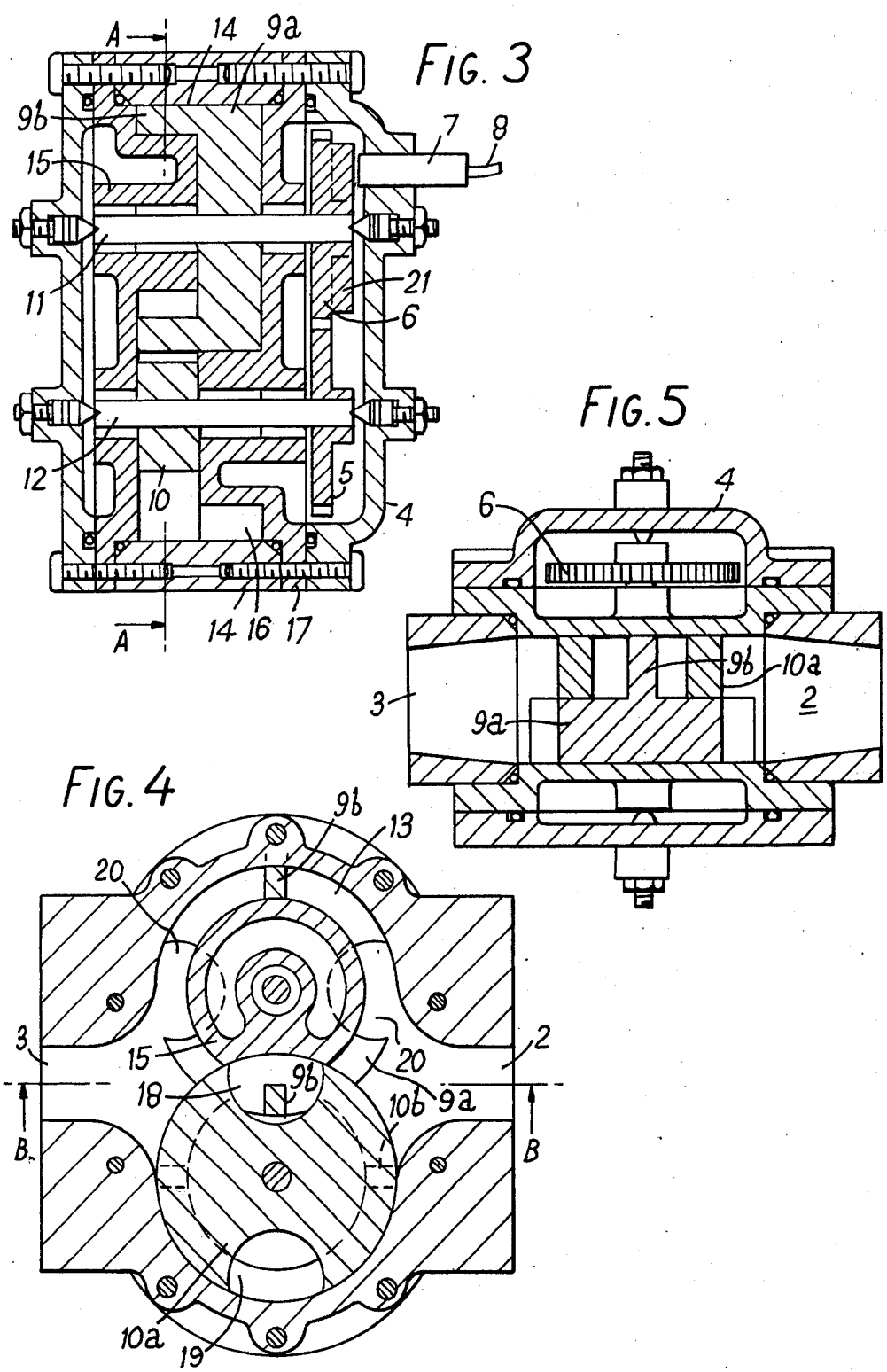

FLUID FLOW METER

The invention relates to a fluid flow meter of a rotary positive-displacement kind.

The invention is particularly concerned with a fluid flow meter of the kind comprising a housing defining an annular cylindrical passage communicating with inlet and outlet ports; a rotor comprising a rotor body from which depend a number of blades which fit the annular passage in sealing relationship so that fluid passing from the inlet to the outlet around the passage drives the rotor by way of the blades; and an idler geared to rotate with the rotor about an axis parallel with and offset from the rotor axis, the idler being basically cylindrical with longitudinal pockets in its side, the pockets each accommodating a rotor blade as the blade returns from the outlet to the inlet and the pocket giving a liquid seal for the rotor blade, the idler running in sealing relationship with a fixed part of the housing. Such a meter will hereinafter be referred to as a flow meter of the kind referred to. The present invention seeks to provide a flow meter of the kind referred to which is particularly compact for a given capacity.

According to the present invention there is provided a flow meter of the kind referred to comprising two rotors, each rotor body being provided with longitudinal pockets and being arranged to constitute the idler for the blades of the other rotor, there being two annular passages coupling the inlet and outlet ports at opposite sides of the housing and offset to accommodate the respective rotor blades.

The flow meter may be used in a household to measure, for example the flow of gas used in domestic gas heating and cooking. Another application is in the measurement of the flow of domestic water. Other applications may include measurement of the flow of liquid fuel in dispensing operations.

It is possible to arrange for the rotors to be of different diameters so that they rotate at different speeds and have appropriately different numbers of blades and pockets. However, it is preferred that the rotors be of the same size and have the same number of blades and pockets as each other. In a preferred embodiment there are two blades and two pockets on each rotor.

Preferably the housing accommodates timing gears which are mounted on axial shafts of the rotors and which mesh together to ensure appropriate timing. In order to give a volume output from the meter it is convenient to use a magnetic proximity switch fixed in the housing and responsive to the passage of a magnetically salient part or parts of one of the rotating structures. Conveniently, this is one or more tangs on one of the timing gears.

The invention will further be described with reference to the accompanying drawings, of which:

FIG. 3 is a cross-sectional view taken at C—C of FIG. 2;

FIG. 4 is a cross-sectional view taken at A—A of FIG. 3; and

FIG. 5 is a cross-sectional view taken at B—B of FIG. 4.

Figure 1:
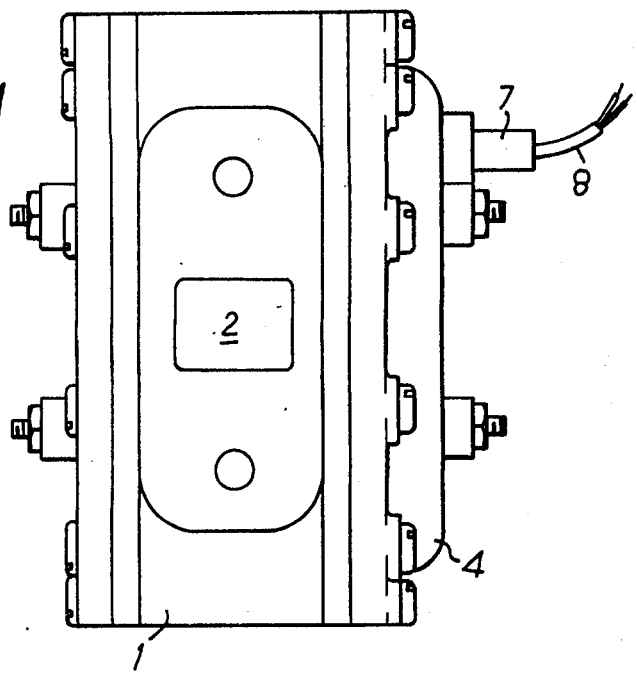
FIG. 1 is a side elevation of a flow meter in accordance with the invention.
Figure 2:
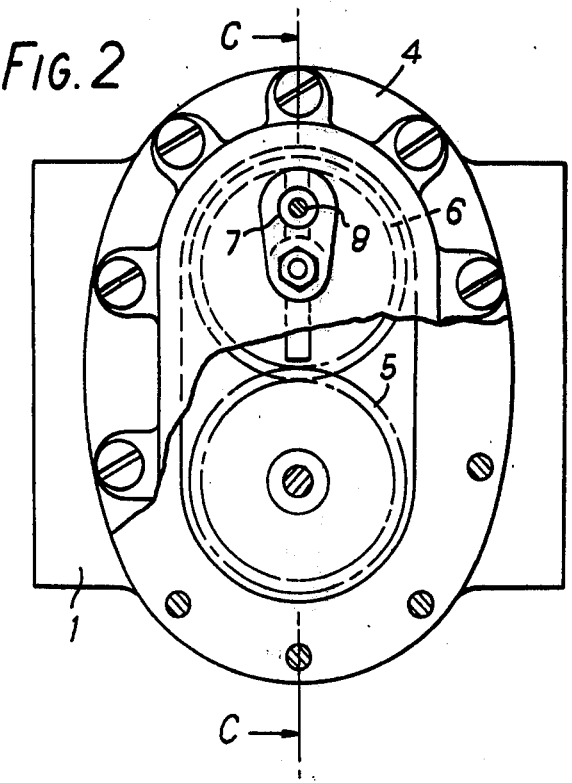
FIG. 2 is a plan view of the meter of FIG. 1.

Referring to the drawings, the flow meter comprises a housing 1 which is cast from aluminum alloy. The housing has two ports at opposite sides which will be designated as inlet port 2 and outlet port 3, although it will be appreciated that the flow meter will operate to measure flow in either direction. Referring particularly to FIG. 1, the housing has a timing case cover 4 which houses timing gears 5 and 6 (FIG. 2). A proximity switch 7 is fixed to the timing cover and gives an output pulse, when energised, for each unit of revolution of the rotors of the meter.

Referring now to FIGS. 3 to 5 the internal structure of the meter is shown. The meter has two rotors 9 and 10, the rotor 9 having a body 9a and blades 9b depending therefrom. Rotor 10 has a body 10a and blades 10b depending therefrom. The two rotors are identical and are fixed on respective shafts 11 and 12 which have fixed on their ends the timing gears 6 and 5 respectively. The timing gears are of the same diameter and are meshed with each other so as to ensure that the two rotors rotate at the same speed and in opposite directions.

In rotating, blades 9b move in sealing relationship in an annular passage 13 defined between the outer wall 14 of the housing 1 and an inner fixed block 15. Movement of fluid from the inlet port 2 to the outlet port 3 drives the rotor 9 by way of the rotor blades 9b in passage 13 in a counterclockwise direction as seen in FIG. 4. Blades 10b of rotor 10 are accommodated in sealing relationship in a similar annular passage 16 defined between the outer wall 14 of the housing and another fixed internal block 17. The action of fluid passing from the inlet port to the outlet port through the passage 16 turns the rotor 10 in a clockwise direction.

In order to return the rotor blades from the outlet side of the meter to the inlet side without experiencing the in-flowing pressure of the fluid, the blades are returned in sealed pockets formed in the idler portion of the rotor. Thus, for example, FIG. 4 shows one of the blades 9b being returned in a pocket 18 formed in portion 10a. The body 10a co-operates in sealing relationship with the fixed block 15 so that the pocket 18, which is a cylindrical recess in the wall of portion 10a is sealed and embraces blade 9b as the blade returns from outlet to inlet. Another pocket 19 diametrically opposite to pocket 18 accommodates the other blade 9b in a similar way. Pockets 20 in portion 9a accommodates the blades 10b.

It will be seen that the meter can be regarded as two similar meters of the positive displacement rotary kind disposed adjacent to each other. The bisecting plane of the rotors is shown at P in FIGS. 3 and 5 so that one meter may be regarded as lying to the lefthand side of plane P in FIG. 3 (beneath the plane in FIG. 5) and the other meter to the right-hand side of plane P in FIG. 3 (above the plane in FIG. 5).

The arrangement described has the advantage that the two rotors can be cast as identical components, as can the stationary blocks 15 and 17. The material of the rotors and blocks is conveniently aluminum alloy which is anodized.

The output from the meter is taken as a series of pulses from proximity switch 7 which responds to the passage past the switch of each of a number of tangs 21 mounted on timing gear 6. These projecting tangs are of ferromagnetic material and represent magnetically salient features to which the switch 7 responds. Thus, the switch is closed to give an output pulse, when energized, for each unit of rotation of gear 6. The output pulses are counted, sealed in accordance with the calibration of the meter and fed to drive a digital volume indicator by conventional electronic techniques.

The invention is not restricted to the details of the embodiment described above with reference to the drawing. For example, it is envisaged that instead of being made of metal some or all of the parts may be moulded in plastics materials. The detector for giving a volume output may be other than a magnetic proximity switch. For example, an optical detector may be used, or there may be provided a mechanical counter which can be operated by a sealed shaft. In another arrangement a mechanical counter may be housed within the body of the meter, being visible through a pressure-tight window.

I claim:
1. A fluid flow metering device comprising:
   a housing, said housing having an inlet port, and an outlet port, and a plurality of annular passages coupling said inlet and outlet ports;
   a plurality of rotor means rotatably fitted in said annular passageway for rotating as fluid flows through said passageways from said inlet to said outlet, each rotor means being comprised of:
   a rotor body rotatably fitted in said annular passageways, said rotor body having at least one blade portion depending therefrom fitting in one of said annular passages in a sealing relationship therewith, so that the fluid passing between the inlet and outlet ports through the passageway causes the rotor body to rotate by forcing against said blade portion, said rotor body further having at least one longitudinal pocket therein accommodating a blade portion of another rotor body in said passageways as the blade portion of the other rotor body rotates from the outlet to the inlet, said pocket forming a liquid seal for said blade portions; and
   gear means coupled to said rotor means for causing said plurality of rotor means to rotate together in opposite directions.

2. A device as claimed in claim 1, wherein said rotor bodies are of the same size and have the same number of blade portions and pockets therein.

3. A device as claimed in claim 2, wherein there are two blade portions and two pockets in each rotor body.

4. A device as claimed in claim 2, wherein one of the rotating structures comprised of the rotor means and the gear means has at least one magnetically salient part; and
   said device further comprises a magnetic proximity switch means fitted within said housing adjacent said magnetically salient part for responding to the passage thereby of said magnetically salient part.

* * * * *